UNITED STATES PATENT OFFICE.

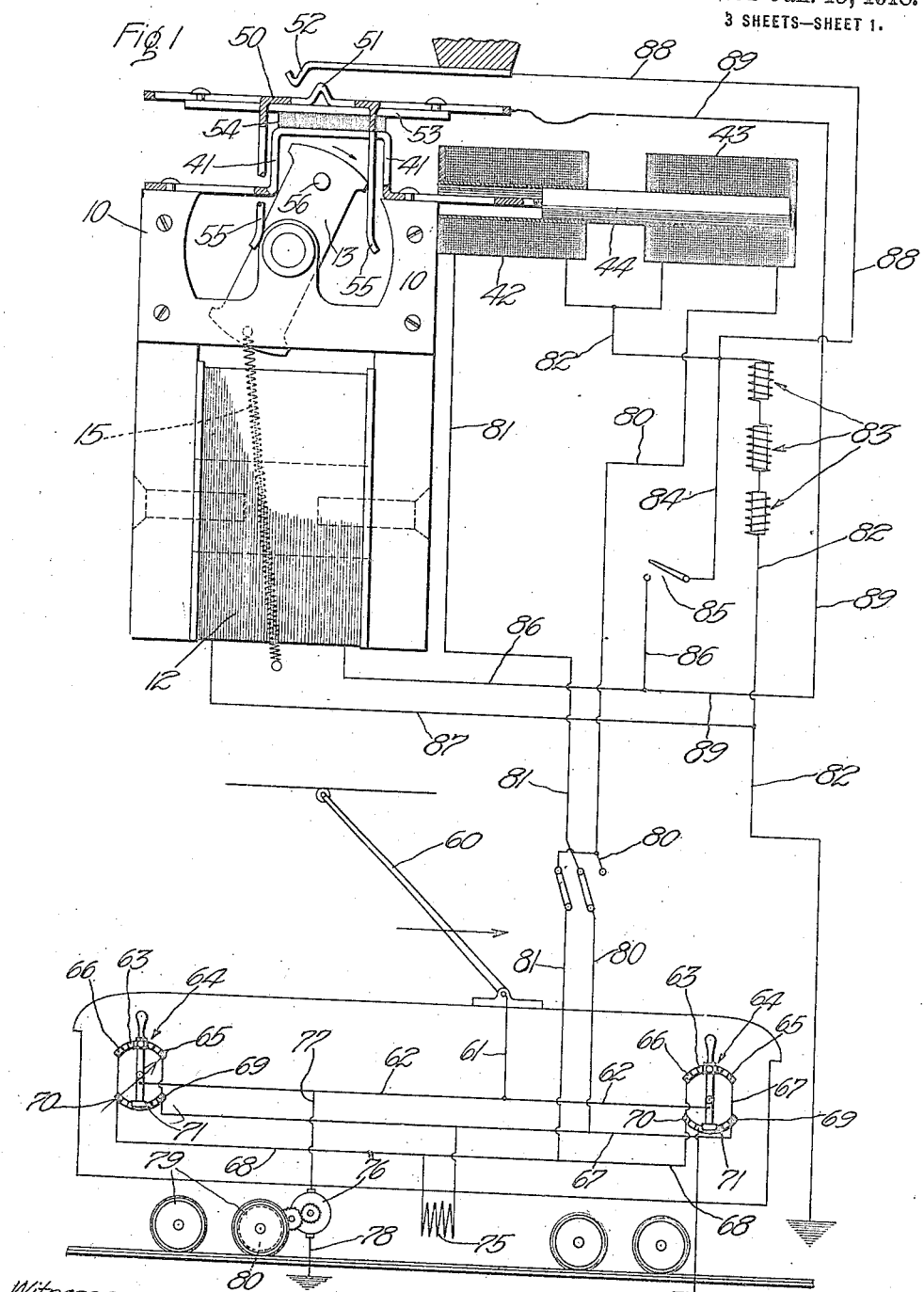

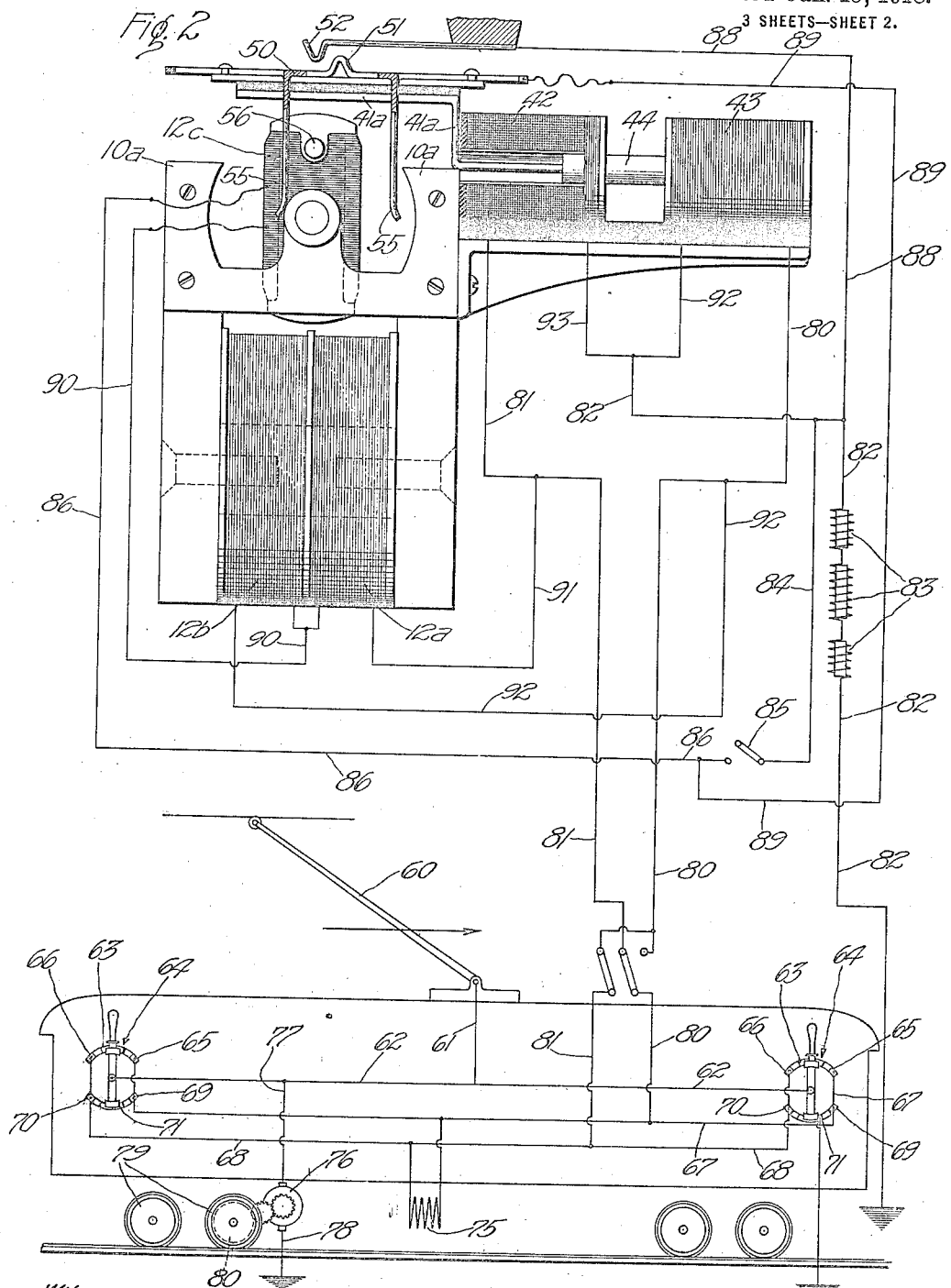

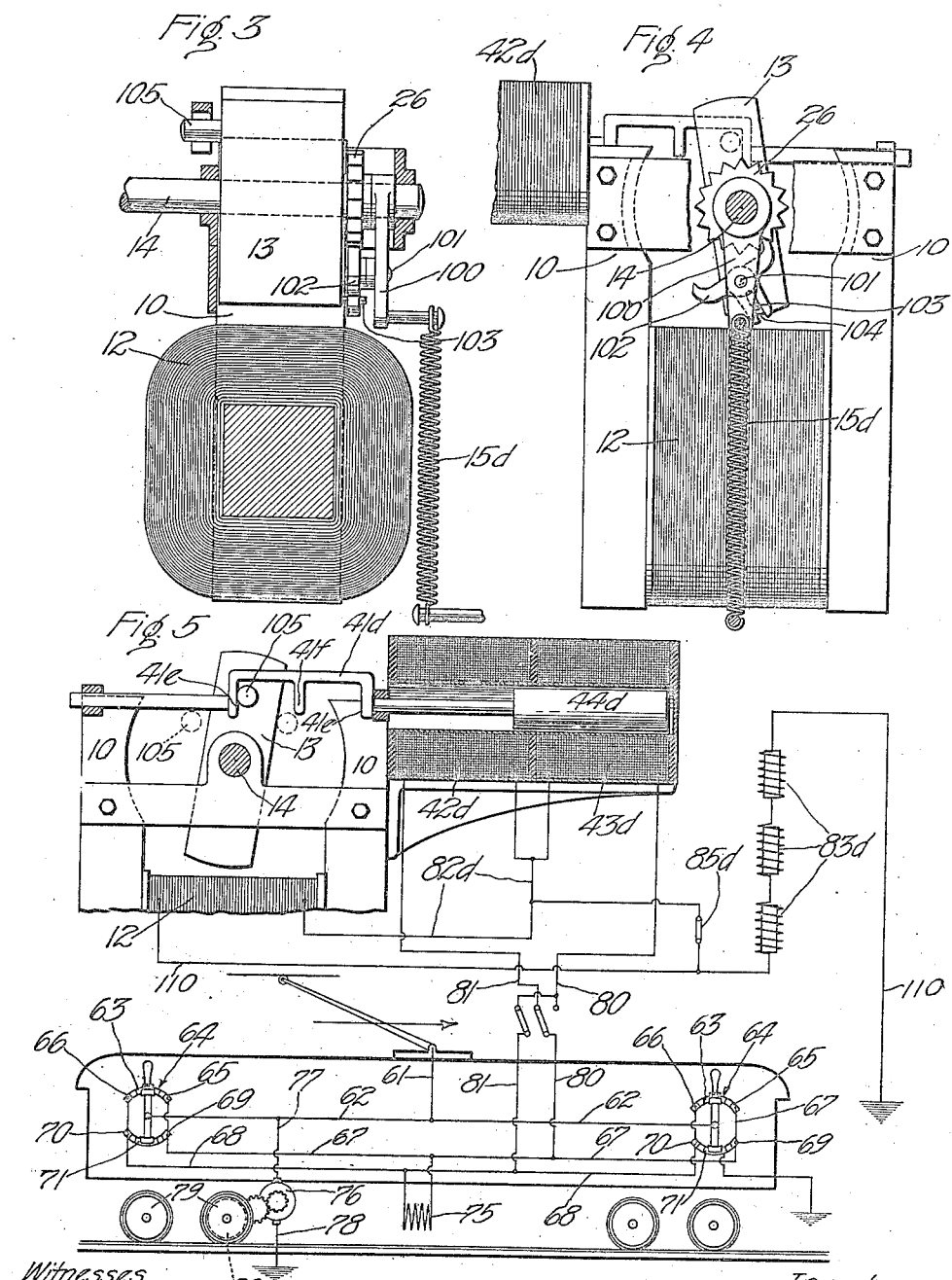

ORLANDO E. KELLUM AND ARTHUR H. SWEETLAND, OF LOS ANGELES, CALIFORNIA, ASSIGNORS TO NATIONAL STREET AND STATION INDICATOR COMPANY, OF LOS ANGELES, CALIFORNIA, A CORPORATION OF CALIFORNIA.

INDICATOR-REVERSING MEANS.

1,253,388.  Specification of Letters Patent.  Patented Jan. 15, 1918.

Application filed October 22, 1914, Serial No. 868,075. Renewed May 31, 1917. Serial No. 172,074.

*To all whom it may concern:*

Be it known that we, ORLANDO E. KELLUM and ARTHUR H. SWEETLAND, citizens of the United States, residing at Los Angeles, in the county of Los Angeles, State of California, have invented new and useful Improvements in Indicator-Reversing Means, of which the following is a specification.

This invention relates to a means for reversing a speed or station indicator or the like on a train or car; and relates particularly to a means whereby the reversing operation is accomplished in coöperation with the reversal of the car.

Broadly considered, our invention includes the combination of a car with reversible motive power and means for reversing the motive power, a reversible indicator mechanism, and means coöperating the two reversing means so that one will cause the operation of the other. In a typical application of our invention, an indicator is placed upon an electrically driven trolley car which is provided with reversing switch arrangements for reversing the motive power. The reversing mechanism of the indicator is connected into the reversing circuits of the motor so that reversal of the motor will cause reverse of the indicator. An important point we wish to particularly point out is the operation of the indicator mechanism one step in the direction to which it is reversed. An indicator placed upon a car is designed to always indicate the next street or station to which the car is advancing; and reversal of the indicator necessitates an actuation in the direction of reversal so as to indicate the next street or station back.

We have shown in the accompanying drawings various means of accomplishing the objects of this invention; and we describe in detail in the following specification the fundamentals and particulars involved. In these drawings, Figure 1 is a diagram showing one form of our invention, Fig. 2 is a diagram showing another form of the same, Fig. 3 is a longitudinal section of another form of indicator mechanism.

Fig. 4 is a side elevation of the same.

Fig. 5 is a diagram showing a third form of the invention applied to the mechanism of Figs. 3 and 4.

In Figs. 1 and 2 of the drawings we have shown a type of indicator actuating mechanism such as patented to Orlando E. Kellum on August 13th, 1913, by Patent No. 1,069,881; and we explain one form of our present invention in connection with this indicator actuating mechanism, although it will be understood that in a broad sense our invention may be combined with other indicator actuating mechanisms.

It will herein suffice to explain that said indicator actuating mechanism includes a field magnet with poles 10, a magnetizing coil 12 and an oscillating armature 13. The armature by its oscillation causes step by step operation of the indicator or other mechanism in either direction, depending upon the direction of movement of the armature. The armature may be either a plain soft iron core, as in Fig. 1, or may have a magnetizing coil $12^c$ as in Fig. 2. The armature is normally held, and returned to, position by a suitable spring 15, or equivalent. Suitable stop mechanism is used in Fig. 1 for holding the armature slightly tipped in one direction or the other so that energization of the field magnet will cause movement in the direction of tip. Thus, from the position shown in Fig. 1 the armature will move in the direction indicated by the arrow. When it is desired to operate the mechanism in the opposite direction, the armature is normally held in a position correspondingly inclined oppositely to the position shown in Fig. 2; when energization of the field magnet will cause oscillation of the armature in the opposite direction. Cessation of current to the field magnet allows the armature to resume its normal position. All of these features are explained in detail in the above mentioned patent; it is with the following described reversing mechanism that the present invention particularly deals.

In Fig. 1 we have shown a simple form of reversing mechanism applied to the indicator mechanism. Slidably mounted on the upper end of the field magnet is a stop frame 41 having an inverted U-shaped portion over the upper end of the armature. This stop frame is slidable from the position shown in Fig. 1 to a position toward the left opposite the position shown in Fig. 1; in which position the armature is held in a position oppositely inclined to that shown. We provide electro-magnetic means for moving the stop frame. This means may include a pair of solenoids 42 and 43 operating upon a core 44 directly attached to the stop frame 41. Energization of solenoid 42 will throw the stop frame to the left in Fig. 1; energization of the solenoid 43 will move the stop frame to the position shown in Fig. 1. Thus, energization of one or the other of solenoids will move and hold the stop frame to either of the positions in which the armature is normally held for operation in one of its two directions. Upon the upper part of the stop frame there is slidably mounted an insulated contact strip 50 having a contact 51 thereon adapted to engage a stationary contact 52. The stationary contact may be mounted upon any convenient part of the mechanism. The contact slider 50 is free to slide upon the stop frame 41, being slidingly mounted upon a plate 53 which may be mounted upon the stop frame through the medium of an insulating block 54. The contact slider has two depending arms 55 adapted to be struck by a pin 56 on the armature. In the operation of the device, if it is wished to reverse the indicator from the position shown in Fig. 1, current is supplied to solenoid 42. The stop frame 41 will be moved to the left in Fig. 1 and the armature will be moved over to a position inclined oppositely to that shown. Any energization of the field coil will cause oscillation of the armature in the direction opposite to that indicated. At the same time that the stop frame is moved to the left, the contact slider with contact 51 is moved to the left until the contact 51 engages stationary contact 52. The stop frame will then move beneath the contact 51 and the slider held from further movement by engagement of the two contacts. Engagement of these two contacts is used to close the circuit to the field magnet to energize it and cause oscillation of the armature in the direction opposite to that indicated. As the armature oscillates the pin 56 engages the left hand arm or finger 55 and forces the movement of the contact slider farther to the left in Fig. 1, carrying the contact 51 as far to the left of contact 52 as it is shown to the right of that contact in Fig. 1. The parts are arranged so that engagement between the two contacts is broken as the armature reaches its final position and has rotated the shaft 14 through a complete step of its movement (in this case, through a sixth of a revolution). If it is desired to reverse the operation of the indicator again, the solenoid 43 is energized and the parts are all moved back to the position shown in Fig. 1, the armature being moved to the position shown in Fig. 1 and the contact 51 brought into engagement with the contact 52; whereupon the armature will oscillate in the direction indicated and cause the rotation of the shaft 14 through one step in that direction and will cause breaking of the engagement between the two contacts when it has completed said oscillation.

The above described means constitute those parts of our invention which are immediately attached to or operate upon the indicator mechanism or indicator actuating mechanism. In Fig. 1 we have shown the combination of the above described parts with the motive power and reversing mechanism of a car. We have preferably illustrated diagrammatically an electric trolley car; although it will be understood that our invention may be applied to other forms. In Fig. 1 we have shown the trolley at 60 and have shown a wire 61 leading therefrom to wire 62 which leads to center contacts 63 of reversing switches 64, of which there are usually two, one at each end of the car. The two other contacts 65 and 66 are connected to wires 67 and 68 respectively; and the arrangement is such that when the car is proceeding in the direction indicated by the arrow, one or the other of the switches 64 is thrown to such a position that current is supplied say, to the wire 67. At the same time the wire 68 may be connected to ground through the reversing switch. Wires 67 and 68 may connect to contacts 69 and 70 which are connected by the switch 64 to the ground contact 71; the arrangement being such that when one of the wires is connected to the trolley the other is connected to ground. The field winding 75 of the motor may be connected across the wires 67 and 68, while the armature 76 of the motor may be connected by wires 77 and 78 to the wires 62 and to current. The motor may operate driving wheels 79 through the medium of gears 80. We show this simple diagram merely to illustrate the coöperation of the motive power and reversing mechanism and our indicator mechanism. From the wires 67 and 68 we may extend wires 80 and 81 to solenoids 43 and 42 respectively, while the other side of each solenoid may be connected to a common wire 82 which is ultimately connected to ground. This wire 82 may include in its circuit other magnets or solenoids 83 connected with the indicator and having a part in its operation. Current will normally be flowing through the magnets 83 and through one of the solenoids 42 or 43, normally holding the core 44 in one position or the other. A wire 84 leads from wire 82 to switch 85, which switch is the one which normally causes actuation of the indicator. A wire 86 leads from the other side of this switch to the field winding 12 of the indicator mechanism. A wire 87 leads from the other side of the field winding to the ground wire 82. Closure of the switch 85 will cause actuation of the indicator mechanism by energizing the field; and the direction of operation will depend entirely upon which one of the solenoids 42 or 43 is energized, which in turn depends upon the position of the reversing switches 64; and the position of either of the reversing switches determines the direction in which the car is traveling. From the wire 82 a wire 88 leads to stationary contact 52, while a wire 89 leads from wire 86 to the movable sliding contact 51. It will be noted that the switch composed of contacts 51 and 52 is arranged in parallel with the switch 85; so that the operation of either of these switches will cause operation of the indicator mechanism. When the mechanism is reversed by energization of solenoid 42, say, then the engagement of contacts 51 and 52 causes current to flow from the wire 82 (which leads from the solenoids) to the wire 89, to wire 86 through the field winding 12, and through wires 87 and 82 to ground. This energizes the field magnet and causes actuation of the indicator mechanism as hereinbefore described. This actuation sets the indicator in correct position for reversed operation; and subsequent operations by closures of switch 85 will be in the reversed directions until the mechanism is again reversed by energization of the other solenoid.

In Fig. 2 we have shown a modified form of means for reversal of the indicator mechanism, involving the reversal of relative polarities of the field and armature. In the present case we may prefer to provide the field with two windings $12^a$ and $12^b$ and the armature with a single winding $12^c$. The armature will normally stand in a vertical position and will be attracted in either one or the other direction, depending upon the polarities of the field. In this form the two solenoids 42 and 43 may operate a core 44 as in the form described, but instead of operating a stop frame they merely operate a carrier $41^a$ upon which the contact slider 50 is mounted. The contact slider 50 is constructed similarly to the other previously described and is operated in the same manner. The two wires 81 and 80 lead from the reversing circuits of the car respectively to the solenoids 42 and 43; and the other side of each solenoid is connected to a wire 82 which runs to ground and includes any desired magnets 83. Wire 88 connects into wire 82 and connects stationary contact 52 and wire 89 connects the contact 51 with wire 86 which leads from switch 85 to one side of the armature winding $12^c$. Wire 90 leads from the other side of the armature winding to each of the field coils $12^a$ and $12^b$, and the other sides of the field coils are connected by wires 91 and 92 to wires 81 and 80 leading to the solenoids 42 and 43. When current is passed through wire 81, solenoid 42 is energized and the contact 51 is thrown toward the left in Fig. 2 into engagement with contact 52. Current then flows from wire 81 to solenoid 42 through wire 93, wire 82 to ground; and a branch circuit carries current from wire 81 through wire 91, field coil $12^a$, wire 90, armature winding $12^c$, wire 86, wire 89, contacts 51 and 52, wire 88, wire 82 to ground. Switch 85 is in parallel with the switch formed by contacts 51 and 52.

In the foregoing we have described, in combination with our reversing mechanism, electrical means for causing a single actuation of the indicator mechanism one step in the direction to which the mechanism is reversed. In Figs. 3, 4 and 5 we have shown a means for causing mechanical operation instead of the electrical operation hereinbefore described. In the form of device shown in these figures, we provide a field magnet with poles 10 and winding 12 as in the construction formerly described and an oscillating armature 13 loosely mounted upon a suitable shaft 14. Alongside the armature we provide toothed wheel 26 rigidly mounted upon the shaft. Outside this toothed wheel there is an arm 100 loosely depending from the shaft, which arm 100 carries pivot 101 of a double ended pawl 102 adapted to engage the toothed wheel 26 with either of its ends. The armature 13 carries a pin 103 playing in a slot 104 of the pawl 102 and the movement of the armature tends to oscillate the pawl about its pivot 101. The spring $15^d$ tends to hold the arm 100 in the position shown. Reversal of action is accomplished by initially tipping the armature 13 in one direction or the other. This initial tip has a tendency to engage one end of the pawl with the toothed wheel 26 and to cause movement of the armature to move the toothed wheel and the shaft 14. On backward movement of the armature to its initial position, the pawl will drag over the teeth of wheel 26. The amount of movement may be as desired.

In this form of device we accomplish reversal by initially tipping the armature in one direction or the other. On the back side of the armature we may place a pin 105 which is engaged by a suitable stop frame $41^d$. This stop frame $41^d$ has two terminal shoulders $41^e$ and a central tongue $41^f$. Solenoid core $44^d$ is moved by two solenoids $42^d$ and $43^d$ to move the stop frame $41^d$ between the position shown in Fig. 5 and an opposite position to the left of that shown in Fig. 5. Supposing it is desired to reverse the indicator and that solenoid $42^d$ is energized. The stop frame $41^d$ will move to the left in Fig. 5 and the tongue $41^f$ will engage the pin 105 and will move pin 105 to a position shown at the left in dotted lines, and will move the armature 13 through its full movement in a corresponding direction causing the operation of the shaft 14 through one step in that direction. The tongue 41ᶠ will pass on to the left over the pin 105 and the right hand shoulder 41ᵉ will come to such a position that, when the armature comes back toward its normal position, the pin 105 will strike the shoulder 41ᵉ and the armature will be prevented from returning to an upright position, being then held in a position tilted oppositely to that shown in Fig. 5. Any subsequent energization of the field coil 12 will then cause operation of the armature in a left handed direction in Fig. 5. Subsequent reversal may be effected by energizing the solenoid 43ᵈ, when the parts will be returned to their positions shown in Fig. 5; but in returning to those positions the armature 13 will have been moved in a right handed direction far enough to cause one movement of the shaft 14 in a right handed direction in Fig. 5.

In Fig. 5, we have shown a diagram of a trolley car or the like the same as in Figs. 1 and 2. Wires 80 and 81 lead to one side of the solenoids 43ᵈ and 42ᵈ, and the opposite sides of the solenoids are connected to a wire 82ᵈ. The wire 82ᵈ leads directly to the field winding 12. Wire 110 leads from the other side of the field winding through certain electro-magnets 83ᵈ and thence to ground. The switch 85ᵈ bridges between wires 82ᵈ and 110, the switch 85ᵈ is momentarily opened, causing current to flow through the field coil 12 instead of through the switch 85ᵈ. Other than the peculiarities hereinbefore described, the operation of the form shown in Fig. 5 is the same as of the form shown in Figs. 1 and 2.

We claim—

1. In a device of the character described, a reversible indicator actuating mechanism including an electro-magnetic field magnet and a bi-polar armature, mechanical means for normally holding the armature with either of its poles initially inclined toward one of the field magnet poles, electro-magnetic means for operating said mechanical means to shift the armature from one normal position to the other, and means coöperating with said electro-magnetic means to cause a single operation of the actuating mechanism when the armature is shifted from one position to the other.

2. In a device of the character described, a reversible indicator actuating mechanism including an electro-magnetic field magnet and a bi-polar armature, mechanical means for normally holding the armature with either of its poles initially inclined toward one of the field magnet poles, electro-magnetic means for operating said mechanical means to shift the armature from one normal position to the other, and means coöperating with said electro-magnetic means to cause a single operation of the actuating mechanism when the armature is shifted from one position to the other, said means including a switch adapted to be closed by the movement of said mechanical and electro-magnetic means and adapted to be opened by the movement of the armature.

3. In a device of the character described, an electro-magnetic reversible indicator actuating mechanism adapted to be operated step by step, means for reversing said actuating mechanism, and means for causing a one step advance of said actuating mechanism in the direction to which it is reversed, said means including an electric circuit and a switch therein adapted to be closed by operation of the reversing means and to be opened by operation of said actuating mechanism.

4. In a device of the character described, an electro-magnetic reversible indicator actuating mechanism adapted to be operated step by step, electro-magnetic means for reversing said actuating mechanism, and means for directly causing a one step only advance of said mechanism in the direction to which it is reversed, said means including an electric circuit and a switch therein adapted to be moved to one position by operation of the reversing means and to be moved to its other position by operation of said actuating mechanism.

5. In a device of the character described, an electro-magnetic reversible indicator actuating mechanism adapted to be operated step by step, electro-magnetic means for reversing said actuating mechanism, means including a switch for normally causing the step by step operation of said actuating mechanism in either direction, and means including a switch independent of said first mentioned switch for causing a one step advance of said actuating mechanism in the direction to which it is reversed.

6. In a device of the character described, a reversible indicator actuating mechanism adapted to be operated step by step, means for reversing said actuating mechanism, means for normally causing advance of said mechanism in either direction, and means independent of said normal advancing means coöperating with said reversing mechanism to cause a one step advance of said actuating mechanism in the direction to which the mechanism is reversed.

7. In a device of the character described, a reversible indicator actuating mechanism adapted to be operated step by step, means for reversing said actuating mechanism, means for normally causing advance of the actuating mechanism in either direction, and means controlled by said reversing means to cause a one step advance of the actuating mechanism in the direction to which it is reversed independently of the normal advancing means.

8. In a device of the character described, a reversible indicator actuating mechanism adapted to be operated step by step, means for reversing said actuating mechanism, means for normally causing advance of the actuating mechanism in either direction, and means controlled by the reversing means for causing a one step advance of the actuating mechanism in the direction to which it is reversed.

In witness that we claim the foregoing we have hereunto subscribed our names this 16th day of October, 1914.

ORLANDO E. KELLUM.
A. H. SWEETLAND.

Witnesses:
E. B. ARMSTRONG,
W. L. CONNOR.

Copies of this patent may be obtained for five cents each, by addressing the "Commissioner of Patents, Washington, D. C."